(12) United States Patent
Guthrie

(10) Patent No.: US 8,727,630 B2
(45) Date of Patent: May 20, 2014

(54) SELF-ALIGNING MINIATURE BALL BEARINGS WITH PRESS-FIT AND SELF-CLINCHING CAPABILITIES

(75) Inventor: Alan C. Guthrie, Sharpsburg, GA (US)

(73) Assignee: Spyraflo, Inc., Peachtree City, GA (US)

( * ) Notice: Subject to any disclaimer, the term of this patent is extended or adjusted under 35 U.S.C. 154(b) by 91 days.

(21) Appl. No.: 13/334,220

(22) Filed: Dec. 22, 2011

(65) Prior Publication Data

US 2012/0163746 A1  Jun. 28, 2012

Related U.S. Application Data

(60) Provisional application No. 61/426,714, filed on Dec. 23, 2010.

(51) Int. Cl.
*F16C 23/08* (2006.01)
*F16C 23/04* (2006.01)
*F16C 43/04* (2006.01)

(52) U.S. Cl.
USPC ............................ 384/495; 384/537; 384/558

(58) Field of Classification Search
USPC ......... 384/203, 206, 477, 482, 492, 489, 498, 384/500, 536–537, 495, 558, 585
See application file for complete search history.

(56) References Cited

U.S. PATENT DOCUMENTS

| | | | | |
|---|---|---|---|---|
| 2,114,670 A | * | 4/1938 | Searles | 384/536 |
| 3,224,821 A | * | 12/1965 | Barr | 384/498 |
| 3,252,742 A | * | 5/1966 | Swanstrom | 384/206 |
| 3,314,735 A | * | 4/1967 | Kocian | 384/475 |
| 3,796,471 A | * | 3/1974 | Holm | 384/558 |
| 4,089,095 A | * | 5/1978 | Becker | 29/898.044 |
| 4,094,559 A | * | 6/1978 | Slusarski | 384/498 |
| 4,249,782 A | * | 2/1981 | Frank | 384/473 |
| 4,726,696 A | * | 2/1988 | Dickinson et al. | 384/477 |
| 5,107,589 A | * | 4/1992 | Nisley | 29/898.12 |
| 5,911,515 A | | 6/1999 | Allen et al. | |
| 6,168,530 B1 | * | 1/2001 | Guimbal et al. | 384/498 |
| 6,238,096 B1 | | 5/2001 | Allen et al. | |
| 6,848,750 B2 | * | 2/2005 | Hurwitz | 301/5.301 |
| 7,396,017 B2 | * | 7/2008 | Orlowski et al. | 277/412 |
| 8,047,718 B2 | * | 11/2011 | Kim et al. | 384/206 |
| 2003/0161563 A1 | * | 8/2003 | Sasaki et al. | 384/495 |
| 2005/0238271 A1 | * | 10/2005 | Schafer et al. | 384/460 |
| 2011/0019952 A1 | | 1/2011 | Gutowski et al. | |

FOREIGN PATENT DOCUMENTS

| | | | | | |
|---|---|---|---|---|---|
| JP | 57073222 A | * | 5/1982 | | F16C 23/08 |
| JP | 2006214467 A | * | 8/2006 | | |
| JP | 2009 185980 A | | 8/2009 | | |
| WO | PCT/US2012/029803 | | 11/2012 | | |

* cited by examiner

*Primary Examiner* — Marcus Charles
(74) *Attorney, Agent, or Firm* — Womble Carlyle Sandridge & Rice, LLP

(57) ABSTRACT

A self-aligning miniature ball bearing assembly is disclosed for being pressed into an opening formed in a substrate such as a sheet, a pillar block, a mounting flange, or a shaft. In one embodiment, the assembly is self-clinching when pressed into the opening and in an alternate embodiment the assembly is press-fittable into the opening and held with a friction fit. The miniature ball bearing of the assembly is mounted within a retainer and held against an angled bearing seat by a elastomeric compression ring. This allows the axis of the ball bearing to assume any orientation within a cone having a half angle of about 5 degrees with respect to an axis of the retainer. The ball bearing is thereby self-aligning upon receiving a shaft to be rotationally mounted in the assembly.

20 Claims, 8 Drawing Sheets

SELF-ALIGNING MINIATURE BALL BEARINGS WITH PRESS-FIT AND SELF-CLINCHING CAPABILITIES

REFERENCE TO RELATED APPLICATION

Priority is hereby claimed to the filing date of U.S. provisional patent application No. 61/426,714 filed on 23 Dec. 2010.

TECHNICAL FIELD

This disclosure relates generally to ball bearings and more specifically to miniature ball bearings that are and self-aligning and capable of being press-fit into openings formed in mounting blocks and relatively thin sheet material.

BACKGROUND

Bearings for rotatably supporting the ends or mid-portions of drive shafts and other types of shafts have been used for many years. Such bearings are available in a wide variety of forms for use under an equally wide variety of conditions. For example, bushings made of Teflon® or other low friction plastic material are often used in situations where the shafts supported by the bearings are to be driven at relatively low rotation rates and/or are to bear relatively low lateral loads. To accommodate higher rotation rates and loads, bushings made of relatively soft porous metal such as bronze are often used. These types of metal bushings are advantageous over plastic bushings because they are able to bear higher lateral loads imparted by shafts and are able to accommodate higher rotation rates without overheating. In addition, porous metal bushings can be impregnated with oil or another lubricant to reduce their coefficients of friction substantially.

In situations where high rotation rates and/or high lateral loads are to be accommodated, rolling bearings such as roller bearings, needle bearings, and ball bearings may be preferred. Rolling bearings offer high lateral load bearing capability and have low frictional resistance to accommodate higher rotation rates than static bushings. In addition, miniature rolling bearings often are preferred for use in precision equipment such as printers, copy machines, and the like because of their low friction and high reliability.

When rotating drive shafts are used in equipment such as, for example, printers, plotters, and photocopy machines, it is common to support the shafts in bearings that are mounted in facing walls of a relatively thin metal chassis. In these circumstances, the bearings must be mounted to the walls of the chassis in such a way that they are precisely aligned with each other to receive the shaft without binding. In the past, this has been accomplished in a variety of ways. In some instances, opposing walls of the chassis are punched to form aligned holes. The bushings or bearings are then press fit into a mounting collar having mounting dogs or tabs for mounting the collar to a wall of the chassis with rivets or bolts to align the bearings with each other and with the punched holes in the chassis. While this method can work well, it is nevertheless relatively expensive because the mounting holes for the collars must be very precisely positioned and the collars must be precisely machined for properly aligning the bearings. In addition, several precision machining steps are required to mount the bearings to the walls properly.

This situation has been addressed for roller and needle bearings in U.S. Pat. No. 5,911,515 entitled Self Clinching Rolling Bearing Assembly and for static bushing-type bearings in U.S. Pat. No. 6,238,096 entitled Press-Alignable Bearing Assembly (both owned by the assignee of the present disclosure). The disclosures of these patents are hereby incorporated by reference in their entireties. Generally, these patents disclose self-alignment mechanisms for static and roller bearings that include bearing sleeves with spherical outer surfaces that allow the sleeves to move within their retainers, which are specially shaped to receive and retain the sleeves. While effective, this entails additional manufacturing steps and precision that can increase cost.

In some instances, needle and roller bearings and static bushings are not the most desirable option and a ball bearing is the best choice. For example, ball bearings tend to have a significantly lower profile than roller bearings and bushings and so may be desirable where space is limited. Further, the use of a ball bearing allows a non-hardened shaft to be journaled in the inner sleeve of the ball bearing because the shaft itself does not ride on the balls of the bearing as is does with roller bearings. Ball bearings also can be sealed and permanently lubricated and generally accommodate much higher rotation rates that roller bearings and bushings. They also are preferred for use in higher precision equipment such as medical and research instruments. Unfortunately, however, ball bearings that are either self-clinching or press-fittable as well as self-aligning such as the roller bearings and bushings disclosed in the above patents have not been available, especially for small diameter shafts under about 0.5 inches (12 mm) in diameter. There is thus a need for such a ball bearing.

Self-Aligning Ball Bearings and miniature ball bearings have been available for many years in a pre-mounted form where the bearings are permanently contained within cast iron pillar blocks having mounting flanges that are secured to a surface with fasteners such as rivets or bolts. However, a miniature press-fit self-aligning ball bearing assembly that can selectively be installed in a stock pillar block or stock mounting flange as well as being pressed into a thin sheet material has been an elusive goal. Further, pre-mounted ball bearings can be less economical and their installation can be labor and material intensive and require higher precision. A need exists for a ball bearing, and especially a miniature ball bearing, that addresses the above mentioned and other issues.

It is to the provision of a ball bearing, and particularly a self-clinching or press-fitting miniature ball bearing, that is self-aligning and that addresses the above and other needs that the present disclosure is primarily directed.

SUMMARY

Briefly described, a self-aligning miniature ball bearing is disclosed for use in multiple applications where the bearings are to be mounted in an opening formed in a substrate of metal or other material or in pillar blocks or mounting flanges. In one embodiment, the bearing has an outer race with a generally spherical outer wall. The bearing is mounted in a retainer having an inner wall with a first surface at one angle relative to the axis of the retainer, and a second surface at another angle relative to the axis. The retainer is self clinching when pressed into an opening of the appropriate diameter. The bearing is held in the retainer by means of an elastomeric compression ring disposed in a groove at one end of the retainer. The ball bearing is able move within the retainer so that its axis can assume any orientation within a cone around the axis of the retainer. As a result, a unique self-clinching and self-aligning ball bearing assembly combination is obtained. Alternatively, the retainer may be formed to be press-fit and held in place with friction to provide a self-aligning ball bearing without the self-clinching feature. The system incorporates miniature ball bearings for shaft sizes including 0.375 inches (10 mm) in diameter and smaller, and are thus particularly applicable to small and precision machinery such as printers, copy machines, medical equipment, and research equipment. The assembly of this disclosure will be better understood upon review of the detailed description set forth below, particularly when taken in conjunction with the accompanying drawing figures, which are briefly described as follows.

DETAILED DESCRIPTION

Figure 1:
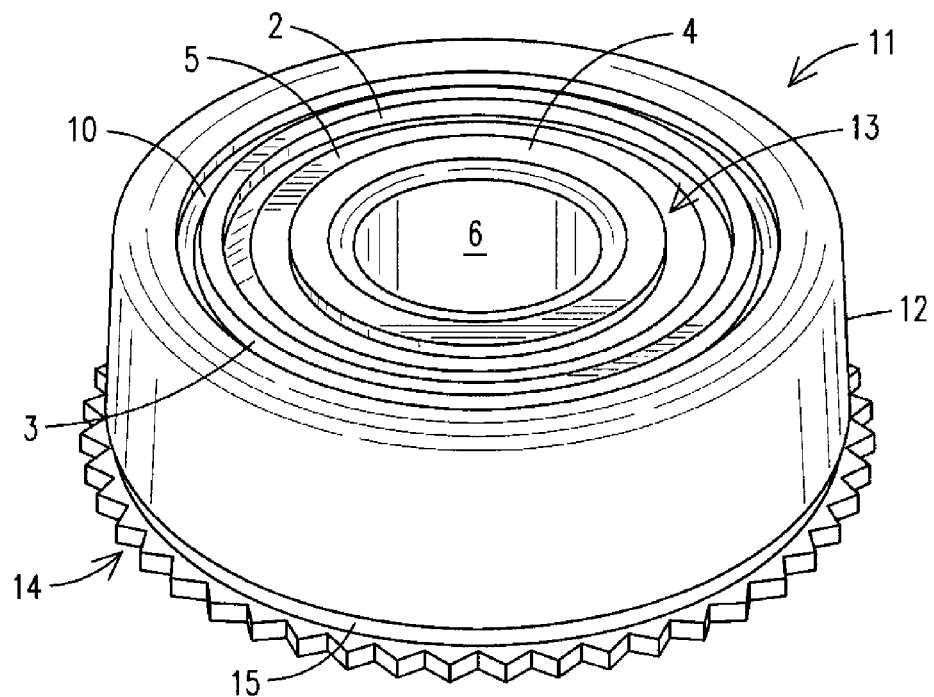
FIG. 1 is a perspective view of a self-clinching miniature ball bearing assembly that embodies principles of the invention in one preferred form.

Reference will now be made to the drawing figures, wherein like reference numerals identify like parts throughout the several views. FIG. 1 illustrates a self-clinching miniature ball bearing assembly 11 that comprises a retainer 12, preferably, but not necessarily, made of stainless steel, aluminum, or other metal and having a tapered outer wall. An annular elastomeric compression ring 10 is disposed in an arcuate groove or slot 8 (FIG. 2a) and extends around the inner wall of the retainer at one end. The elastomeric compression ring 10 is made of an elastomer that can deform somewhat in response to an applied force and respond with a resisting force to an object applying the force. The elastomer allows for fluid-like distortion (definite volume, indefinite shape) without exceeding the elastic limit of the material. Examples of elastomers appropriate for the compression ring 10 of this invention include, without limitation, Polyurethane, Nitrile, Viton, Ethylene Propylene Diene Monomer (EPDM), Polytetrafluoroethylene (PTFE), Neoprene, Silicone, Fluorosilicone, Aflas® (available from Seals Eastern, Inc.), Kalrez® (available from DuPont) and materials with similar properties. In the preferred embodiment, the elastomeric compression ring 10 is annular or generally toroidal in shape. However, other shapes, including various cross-sectional profiles, are possible within the scope of the invention.

A ball bearing 13 is mounted within the retainer 12 and is held in place therein by the elastomeric compression ring 10. The ball bearing 13 has an outer race 2 with a generally spherical outside wall 3, an inner race 4, and a dust seal 5 sealing the space between the inner and outer races. Bearing balls 7 are disposed and rollably captured within facing annular grooves 9 in the inner and outer races (see FIG. 2a) so that the inner race can rotate about its axis within the outer race according to operational principles of ball bearings. It will be understood that ball bearings of other and different constructions are available and may be substituted for the rather simple ball bearing design illustrated in the figures within the scope of the invention. The ball bearing 13 is movable within its retainer about the central axis of the retainer 12 as described in more detail below.

In the embodiment of FIG. 1, a flange or head 14 projects outwardly from the larger end of the retainer and is formed with serrations in this example. A recess 15 is formed in the outer wall of the retainer at the junction of the head and the retainer body. As disclosed in more detail in the incorporated patents, the retainer 12 of FIG. 1 can be pressed into an opening that is slightly smaller in size than the largest diameter of the outer wall of the retainer. If the opening is in a thin sheet of metal, for instance, the opening is stretched slightly as the bearing assembly is pressed into place using a press and a backing anvil and the periphery of the opening flows or clinches into the recess 15 to secure the bearing assembly firmly in place.

Figure 2:
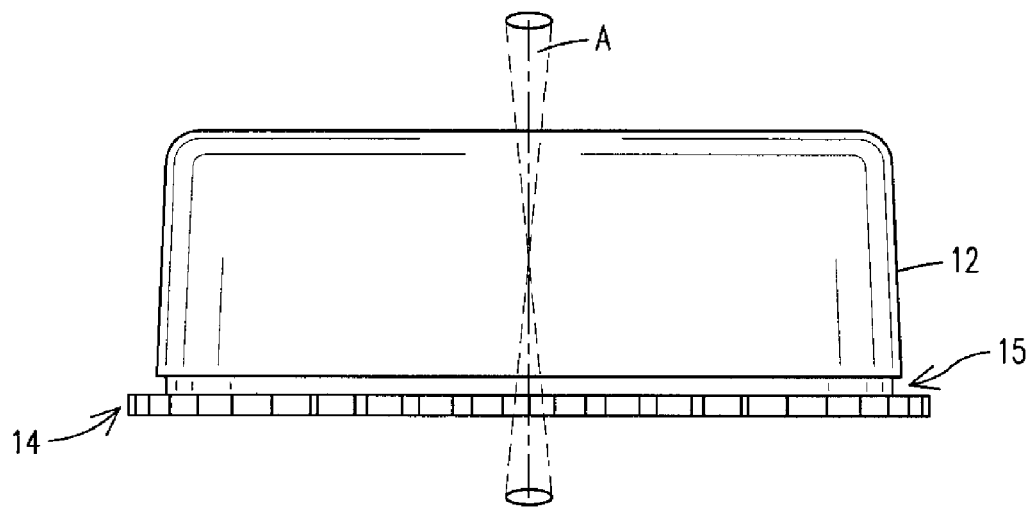
FIG. 2 is a side view of the bearing of FIG. 1 illustrating the nutation of the axis of the ball bearing to obtain self-alignment.
Figure 2A:
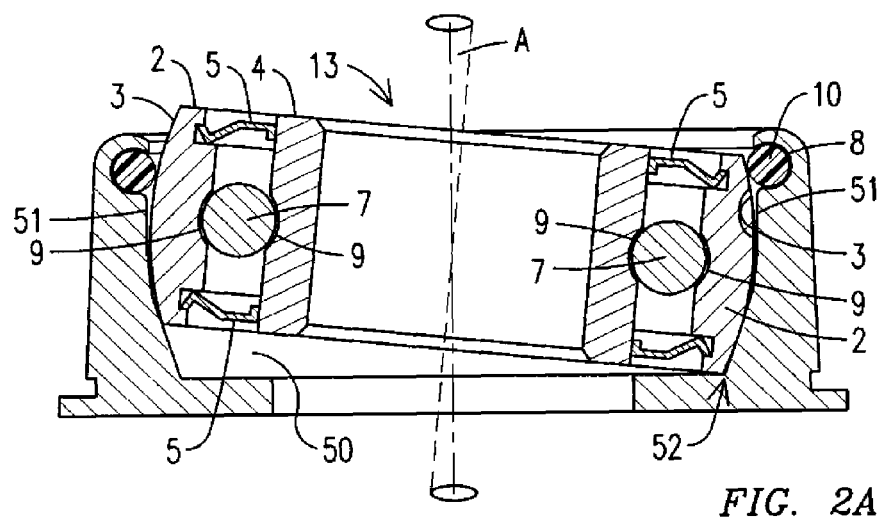
FIG. 2a is a cross sectional view of the bearing of FIG. 1 illustrating the mechanics of movement of the ball bearing within the retainer.

FIGS. 2 and 2a illustrate that the ball bearing mounted within the retainer 12 and held therein with the compression ring 10 can pivot during normal operation through a limited angle in all directions. In this way, the ball bearing is capable of rocking within the retainer such that its axis can assume any orientation within a cone of half-angle A. In this way, the ball bearing automatically orients itself when a shaft is inserted through the central opening 6 of the inner race 4 of the ball bearing to align the ball bearing precisely with the shaft. Thus, the bearing assembly of this embodiment can be said to be self-aligning as well as self-clinching. It has been found that a half angle A of about five degrees (5°) is preferred for many applications, although this is not a limitation of the invention.

FIG. 2a illustrates in more detail the self-aligning movement of the ball bearing within its retainer. The inner wall of the retainer is shaped to define a generally conical primary bearing surface 50 oriented at a first more acute angle relative to the axis of the retainer. The inner wall further defines a secondary bearing surface 51 that is oriented at a second less acute angle relative to the axis of the retainer. The second less acute angle may be zero, meaning that the secondary bearing surface may be parallel to the axis of the retainer, or it may be another angle less acute than the angle formed by the conical primary bearing surface. The spherical outside wall 3 of the outer race 2 has a diameter between the smallest diameter and the largest diameter of the conical primary bearing surface. In this way, the spherical outside wall 3 rests against the primary bearing surface in circular contact when disposed in the retainer. The elastomeric compression ring 10 imparts a force around the ball bearing thereby holding it in the retainer and pressing it with predetermined pressure against the primary bearing surface.

With the just described configuration, and with continuing reference to FIG. 2a, it will be seen that during normal operation, the ball bearing 11 is capable of moving within the retainer such that the axis of the ball bearing is oriented at an angle A relative to the axis of the retainer. Put another way, the ball bearing can move such that its axis is oriented in any direction within a cone of half angle A relative to the axis of the retainer. All the while, the elastomeric compression ring 10 maintains a substantially constant force on the outer race 2 so that it maintains a substantially constant engagement with the primary bearing surface 50. In FIG. 2a, the ball bearing is shown moved within its retainer to its maximum angle, which occurs when an edge of the outer race 2 engages a shoulder of the retainer as indicated at 52.

The material and elastic properties of the compression ring 10 are selected such that the friction between the compression ring and the outside wall 3 of the bearings outer race is sufficient to prevent the outer race 2 of the ball bearing from rotating within the retainer as the inner race of the bearing rotates. At the same time, the compression ring applies less resistance to angular or rocking movement of the ball bearing within the retainer so that it may self adjust and also accommodate any nutation of a shaft journaled within the bearing. This is addressed by the properties of the compression ring allowing less motion resistance for spherical motion of the ball bearing that rotational motion. This is achieved by the amount of contact resistance applicable to each specific motion with spherical motion being resisted less than rotational motion.

Figure 2B:
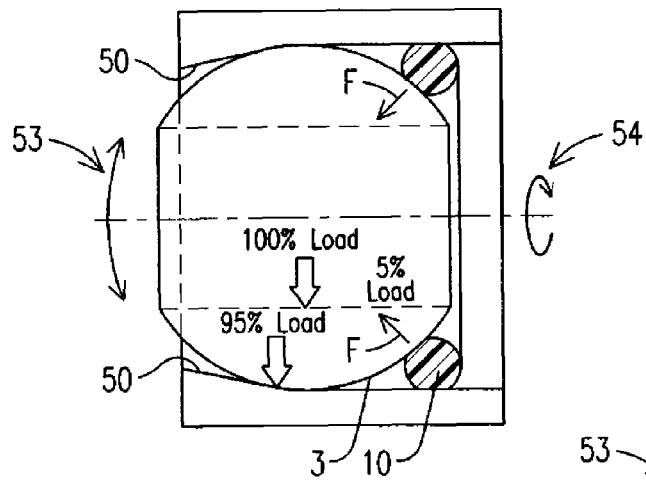
FIG. 2b is a schematic illustration showing principles of normal movement of the bearing within the retainer

FIG. 2b illustrates, in simplified schematic form, the motions of the outer race within the retainer. The exterior wall 3 of the outer race is spherical and rides on the primary surface 50 within the retainer. The elastomeric compression ring 10 applies a predetermined force F to the spherical outside wall of the outer race to hold it against the primary bearing surface 50, while applying relatively less resistance to spherical motion 53 of the outer race within the retainer. At the same time, the elastomeric compression ring 10 applies relatively more resistance to rotational movement 54 of the outer race within the retainer, preventing it from rotating as the inner race is rotated by a shaft disposed therein. This is achieved in part because resistance applied by the compression ring to spherical motion is not equally distributed around the outside wall of the outer ring. Instead, it is highest in the direction of spherical rotation where relative movement between the outside wall and the compression ring is greatest. However, the resistance gradually reduces to near zero toward the plane of the axis of spherical movement where relative movement between the outside wall and the compression ring is near zero. The outer race must not be allowed to rotate within the retainer during operation because the bearing is designed for motion to occur internally of the outer race where the balls, inner race, and lubricants can reduce friction and wear in a calculated and controllable way. The assembly of the present invention insures that this is the case.

Figure 2C:
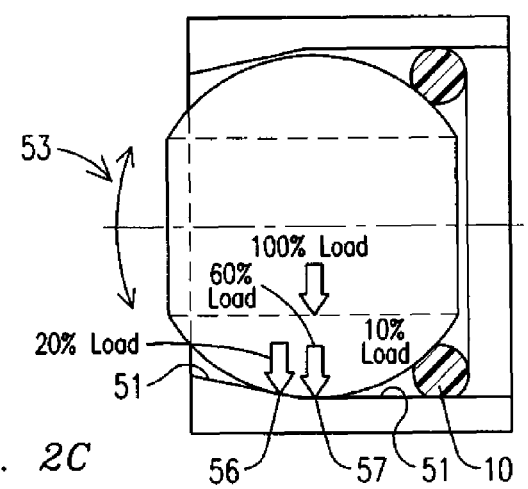
FIG. 2c is a schematic illustration showing principles of overload movement of the bearing within the retainer.

FIG. 2C illustrates the response of the assembly to an overload condition under which a lateral force resulting from a shock for example is applied through a shaft to the ball bearing. In such a situation, the compression ring deforms in the direction of the overload until the spherical outside wall of the outer race engages the primary bearing surface 51 at 56 and 57. Thus, the great majority of the overload is born by the retainer preventing the inner race from moving further than the position in which it is shown in FIG. 2c. At the same time, only a small portion of the load is born by the elastomeric compression ring 10, which prevents the ring from deforming permanently and helps prevent the ball bearing from popping out of the retainer in response to a shock or other overload.

Figure 3:
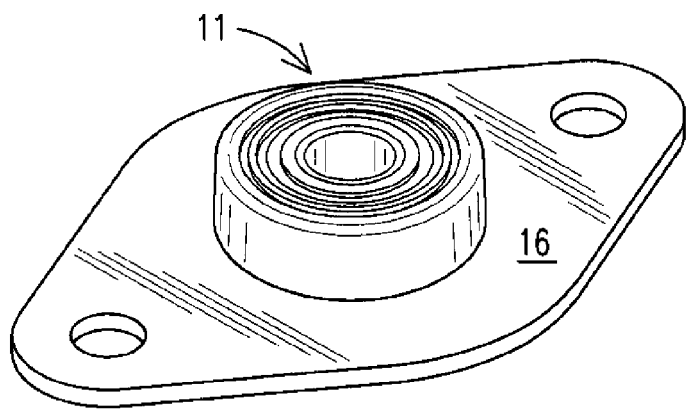
FIG. 3 illustrates the bearing assembly of FIG. 1 fitted into a mounting flange.
Figure 4:
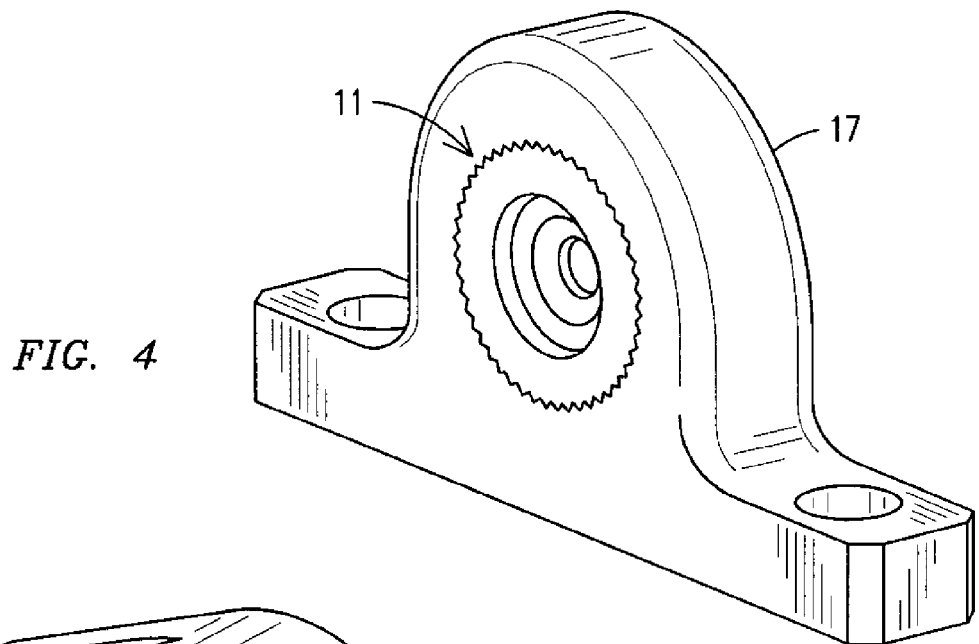
FIG. 4 illustrates the bearing assembly of FIG. 1 fitted into a pillar block.
Figure 5:
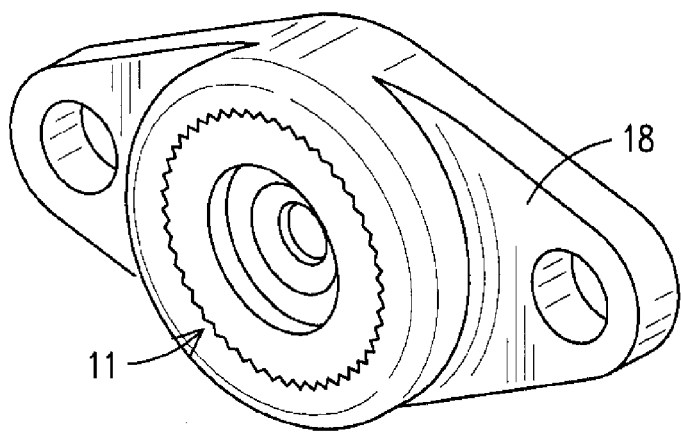
FIG. 5 illustrates the bearing assembly of FIG. 1 fitted into a mounting flange.

FIGS. 3-9 illustrate the bearing assembly 11 of the embodiment of FIG. 1 in several applications to which it is suited. In FIG. 3 the bearing assembly is shown fitted into an opening formed in a mounting flange 16 having a pair of spaced apart mounting holes. The mounting flange 16 can then be secured with fasteners extending through mounting holes in a surface in the traditional way. This mounting technique is common when the axis of rotation of a shaft is to be perpendicular to a surface to which the surface is mounted. FIG. 4 illustrates the bearing assembly 11 of FIG. 1 fitted into the opening of a pillar block 17 having spaced apart mounting holes that, in turn, can be mounted to a surface with fasteners extending through mounting holes and the surface. This technique is useful when the axis of rotation of a shaft is to be parallel to a surface to which the ball bearing assembly is mounted. FIG. 5 illustrates the bearing assembly 11 of the embodiment of FIG. 1 fitted into an opening of a relatively thicker mounting flange having spaced apart mounting holes, which, again, can be mounted to a surface in the traditional manner with fasteners extending through the mounting holes and through the surface.

Figure 6:
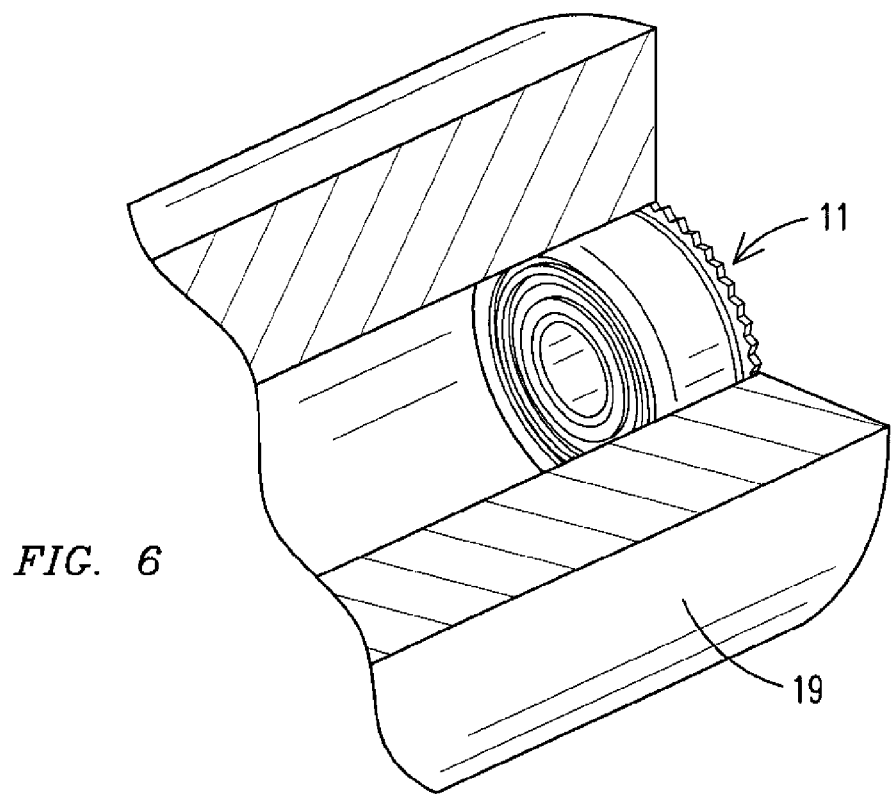
FIG. 6 illustrates the bearing assembly of FIG. 1 fitted in the end of a cylindrical shaft.

FIG. 6 illustrates the bearing assembly 11 of FIG. 1 fitted into the end of a hollow cylindrical shaft 19. This allows the shaft 19 to be rotatably mounted onto a mandrel (not shown) for rotational motion. When so mounted, the ball bearing aligns itself automatically with the mandrel to insure smooth rotation of the shaft and accommodate any nutational motion. More specifically, any misalignment between the mandrel and the ball bearing causes the ball bearing to move spherically within the retainer to align with the mandrel, as described in detail above. In all of these applications, the precision required in machining and mounting the elements into which the bearing assembly is fitted is significantly reduced because of the self-aligning feature of the bearing assembly itself. Furthermore, a custom part can be made quickly and easily by pressing the very same bearing assembly configuration into a pillar block, a mounting flange, a rod, or other component. Thus, inventory of such parts can be reduced significantly.

Figure 7:
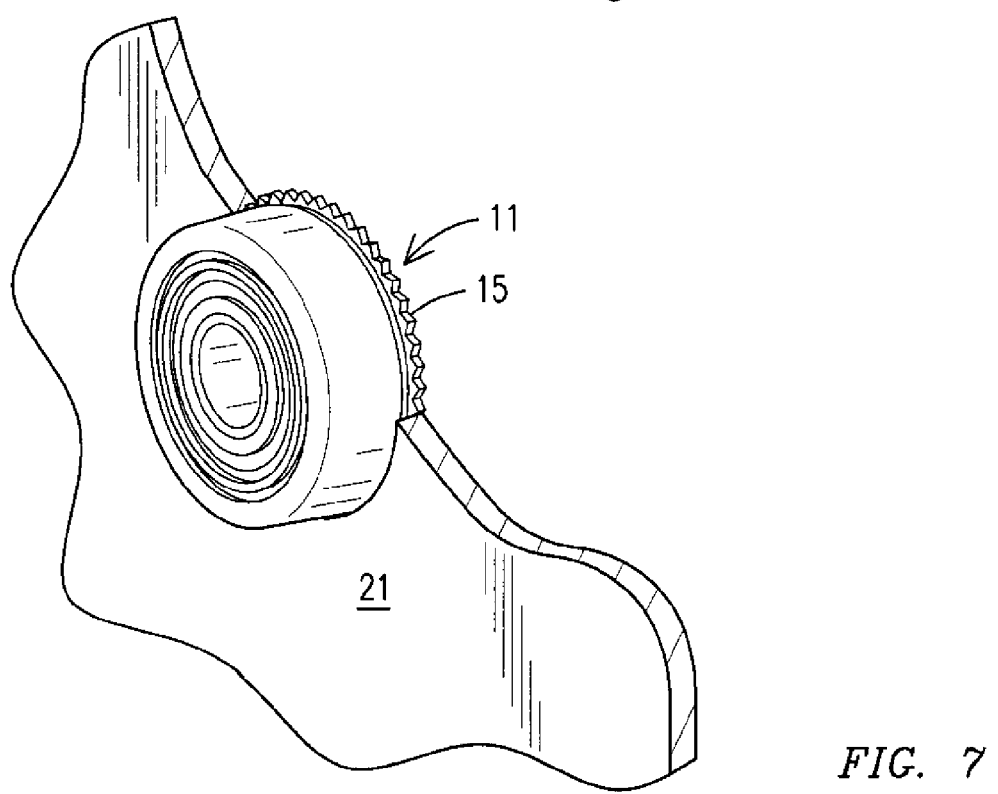
FIG. 7 illustrates the bearing assembly of FIG. 1 fitted in an opening formed in a thin metal sheet.
Figure 8:
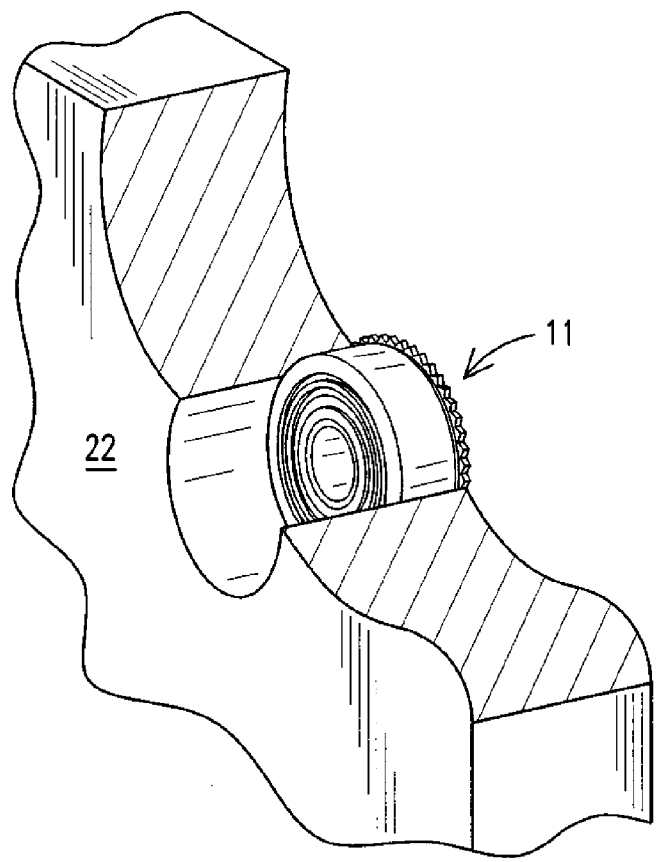
FIG. 8 illustrates the bearing assembly of FIG. 1 fitted in an opening formed in a thick metal plate.
Figure 9:
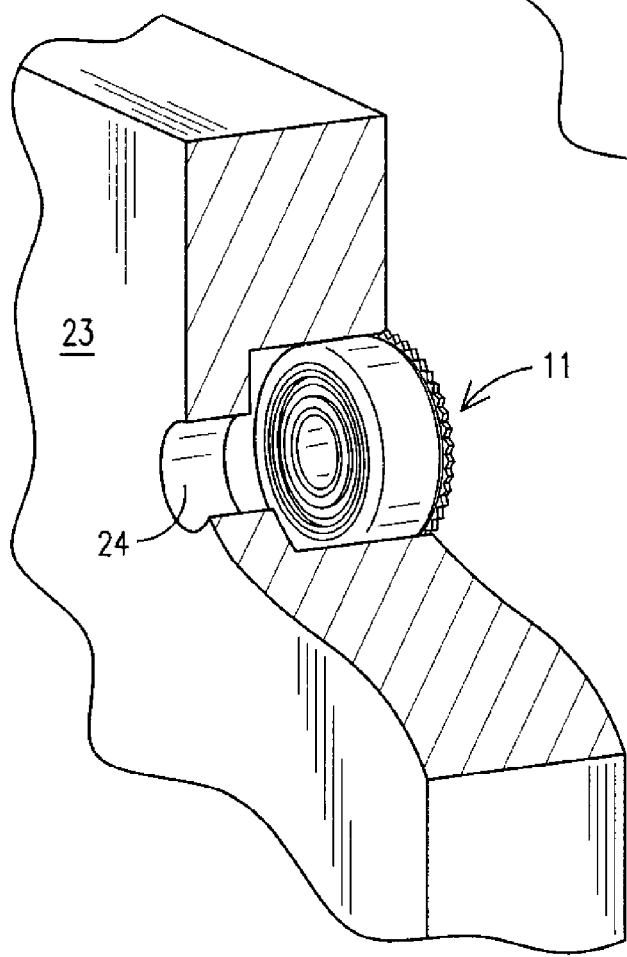
FIG. 9 illustrates the bearing assembly of FIG. 1 fitted a stepped opening formed in a thick metal plate.

FIG. 7 illustrates the bearing assembly 11 of FIG. 1 fitted directly into an opening formed in a thin metal plate 21. When pressed into a sufficiently thin plate, the bearing assembly clinches itself automatically into the opening with the periphery of the opening locking into the recess 15 of the bearing assembly as described above and in the incorporated references. FIG. 9 shows the bearing assembly 11 of FIG. 1 fitted into an opening in a thicker metal (or plastic or other material) plate. In this application, the bearing assembly may not clinch itself within the opening (absent a rim at the mouth of the opening), but may nevertheless be secured with a friction fit. Alternatively, a rim may be formed at the mouth of the opening so that the bearing assembly clinches or locks onto the rim as it does when fitted into a thinner sheet. FIG. 9 shows a variant of the application of FIG. 8 where the bearing assembly 11 is fitted into a stepped opening in a thicker plate made of metal, plastic, or another material. Again, a rim can be provided at the mouth of the opening if desired to take advantage of the self-clenching feature of the bearing assembly 11.

Figure 10:
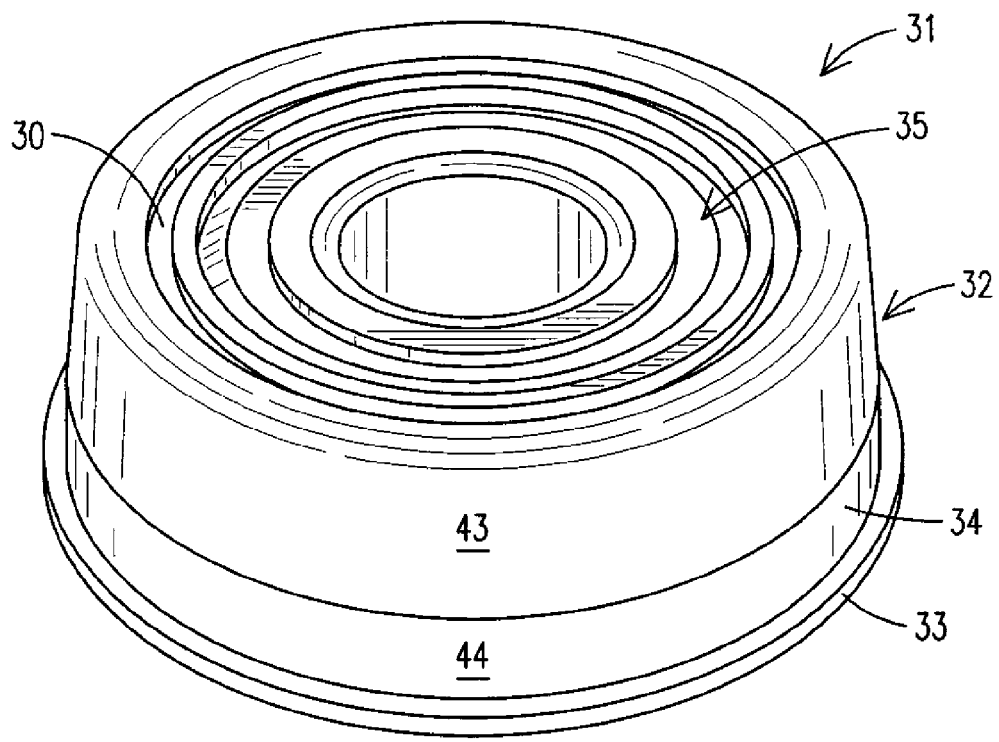
FIG. 10 is a perspective view of a press-fit bearing assembly that embodies principles of the invention in an alternate form.

FIGS. 10-15 illustrate an alternate embodiment of the miniature ball bearing assembly that is press-fittable into an opening and locked in place with a friction fit rather than a mechanical clinch as with the embodiment described above. Referring to FIG. 10, the bearing assembly 31 of this embodiment comprises a retainer 32, preferably formed of stainless steel, aluminum, or other metal or rigid material. The retainer 32 has an outer wall with a frustroconical portion 43 and a cylindrical or near-cylindrical portion 44. A flange or head 33 projects radially outwardly from the larger diameter end of the retainer 32. A elastomeric compression ring 30 is secured within the retainer 32 as described above. A ball bearing 35 is mounted in the retainer 31 and held in place by the compression ring 30. The bearing is thus self-aligning as described above.

Figure 11:
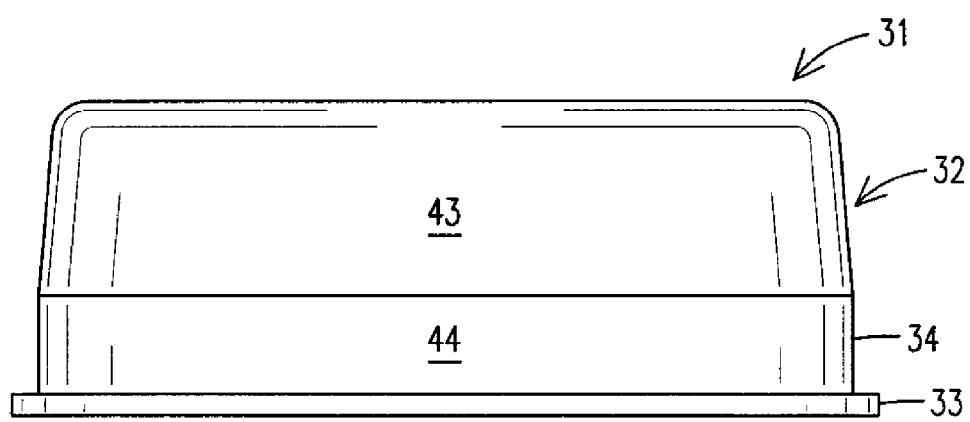
FIG. 11 is a side elevational view of the bearing assembly of FIG. 10.
Figure 12:
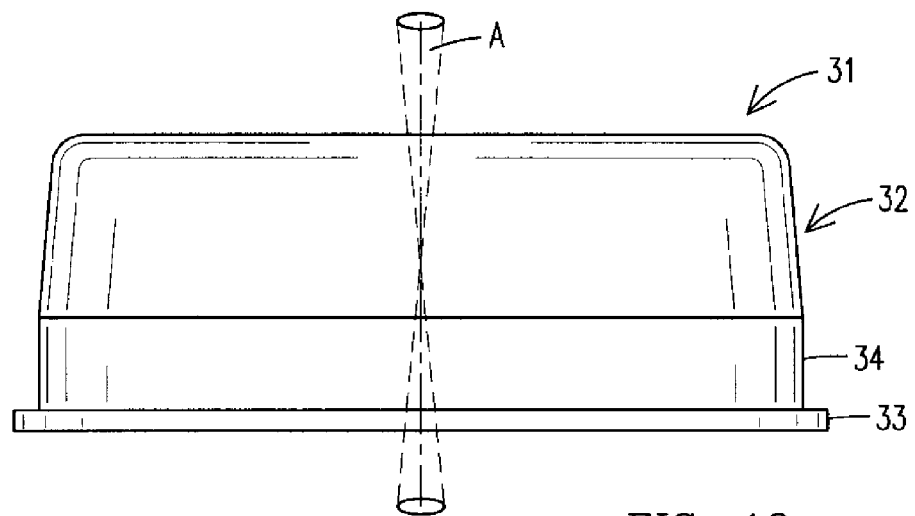
FIG. 12 is a side elevational view of the bearing assembly of FIG. 10 illustrating the nutation of the axis of the ball bearing to obtain self alignment.

FIG. 11 is a side elevational view of the bearing assembly 31 and illustrates perhaps better the frustroconical portion 43 of the retainer outer wall and the cylindrical or near cylindrical portion 44. With the illustrated configuration, the bearing assembly can be pressed into an opening that is slightly smaller in diameter than the diameter of the cylindrical portion 44 of the retainer. The bearing assembly then locks into the opening with a friction fit rather than a mechanical clinch as with the prior embodiment. Again, the bearing assembly may be pressed in place with a traditional press and anvil or other appropriate tool. FIG. 12 is a side elevational view of the bearing assembly 31 illustrating the range of movement of the ball bearing with respect to the retainer such that its axis may take on any orientation within cone with half-angle A. A half angle A of about five degrees has been found useful for many applications. In this way, the ball bearing positions itself automatically to align with a shaft inserted therein and is thus self-aligning.

Figure 13:
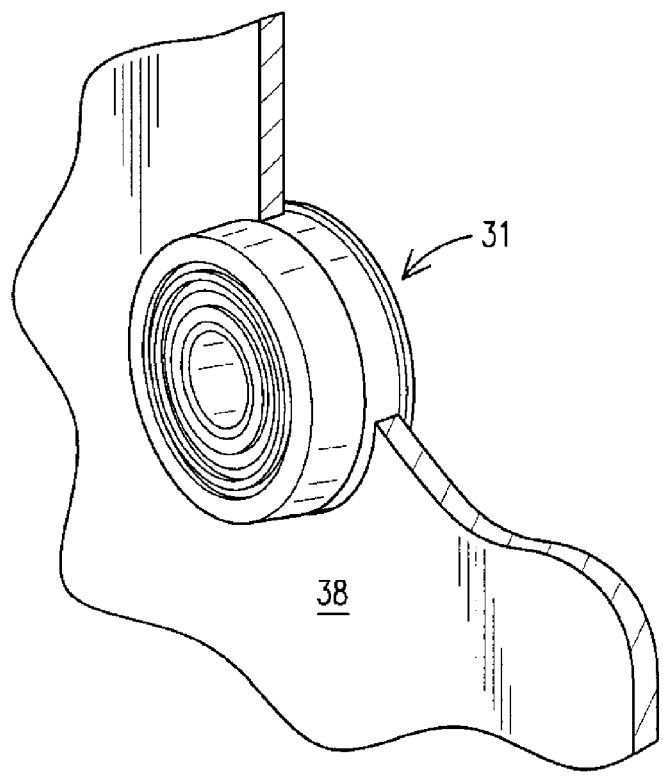
FIG. 13 illustrates the bearing assembly of FIG. 10 fitted in an opening formed in a thin metal sheet.
Figure 14:
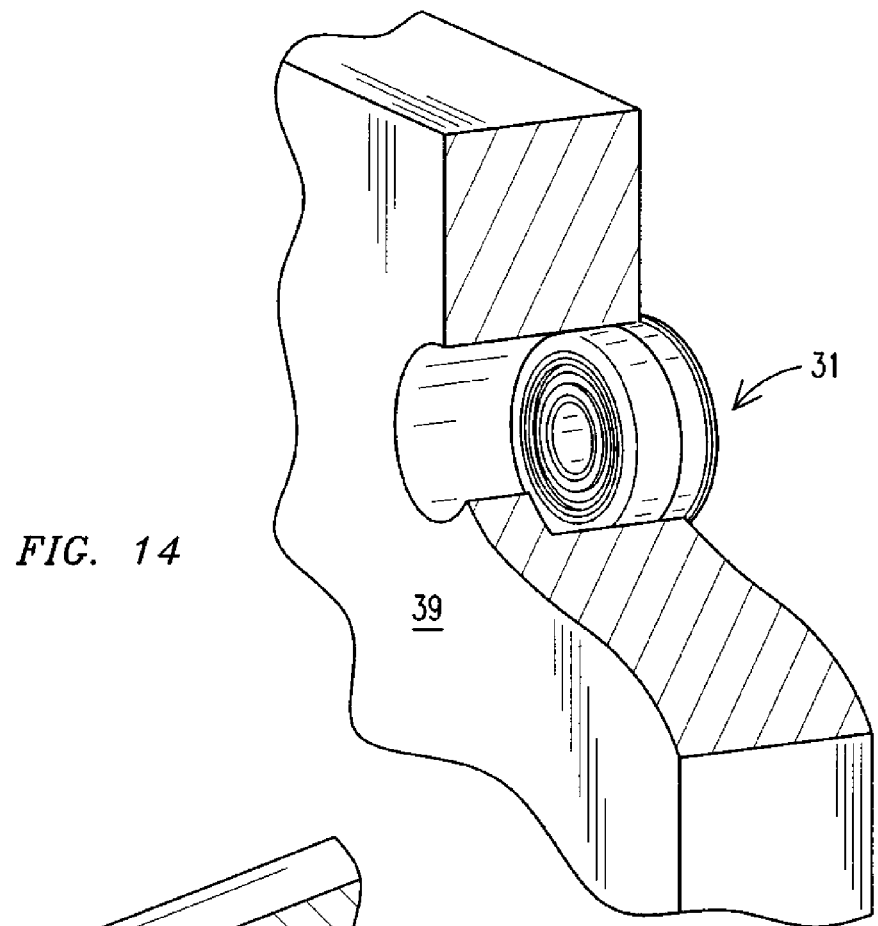
FIG. 14 illustrates the bearing assembly of FIG. 10 fitted in an opening formed in a thick metal plate.
Figure 15:
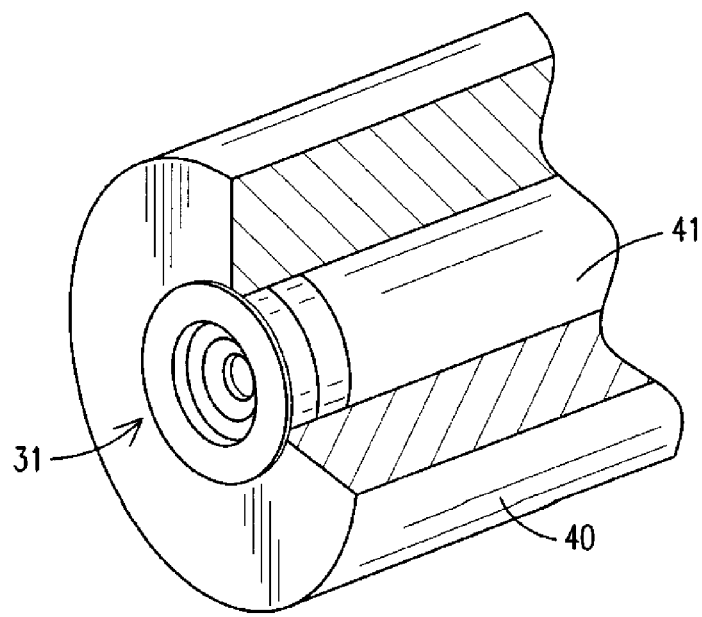
FIG. 15 illustrates the bearing assembly of FIG. 10 fitted in an end of a cylindrical shaft.

FIGS. 13-15 illustrate several possible applications of the bearing assembly embodiment of FIG. 10. FIG. 13 shows the bearing assembly fitted into an opening in a relatively thin sheet of metal (or plastic or other material). FIG. 14 shows the bearing assembly fitted in an opening of a relatively thick mounting plate. FIG. 15 shows the bearing assembly embodiment of FIG. 10 fitted into an opening in an end of a hollow cylindrical shaft. It will be seen that this embodiment of the miniature ball bearing assembly is fitted by being pressed into an opening. The frustroconical portion of the retainer allows the assembly to enter the opening easily. As the retainer progressively moves into the opening, it gradually becomes tighter and more aligned with the opening until the cylindrical portion of the retainer presses into the opening and secures the assembly with a friction fit.

The self-aligning press-in miniature ball bearing exemplified by the embodiments described above offers a number of advantages over prior art miniature bearing assemblies such as fixed ball bearing assemblies and roller and static bearings. For example, ball bearings have a much lower profile than roller bearings and bushings allowing a more flush assembly to be used in similar applications. The tapered adaptive outer surface of the retainer prevents binding upon being pressed into an opening of a panel, which can easily happen when a plain ball bearing is pressed into such an opening. The use of the elastomeric compression ring, in addition to offering self-aligning properties, supports shock resistance properties of the assembly as described. A steel retainer resists deformation during installation and therefore prevents binding of the ball bearing in use. Further, the retainer tends to retard hyper-alignment if alignment is attempted beyond the angular constraints of the assembly. The retainer may be formed groove for receiving the compression ring that is shaped other than annular as shown, particularly when the compressing ring is not itself annular. Finally, the primary bearing surface of the retainer provides for a self-centering bearing seat, which insures more accurate rough alignment of the bearing during fabrication.

Embodiments of the invention have been described above. It will be clear to skilled artisans, however, that a wide variety of additions, deletions, and modifications, both subtle and gross, might be made to the illustrated embodiments without departing from the spirit and scope of the invention. For instance, the bearing assemblies have mostly been illustrated as being fitted into metal plates, sheets, and fixtures. However, they also may be fitted into structures made of any other material such as plastics and such applications should be considered to be incorporated into this disclosure. Further, the second embodiment that is press-fittable but not self-clinching provides the additional capability of removing a bearing assembly for repair or replacement without significantly damaging the opening or structure into which it was fitted. These and other changes may be made within the scope of the claims hereof.

What is claimed is:

1. A self-aligning ball bearing assembly comprising:
a generally annular retainer having a central axis, an outside wall, and a generally conical inside wall, the inside wall defining a bearing seat;
a ball bearing having an outer race and an inner race, the outer race having an arcuate outside wall;
the ball bearing being disposed in the retainer with its arcuate outside wall resting against the bearing seat of the inside wall of the retainer, the arcuate outside wall of the outer race has a diameter between a smallest diameter and a largest diameter of the generally conical inside wall of the retainer;
an elastomeric compression ring mounted within the retainer and bearing against the arcuate outside wall of the outer race of the ball bearing, the elastomeric compression ring being positioned to apply force to the outer race to hold the outer race against the bearing seat; and
the elastomeric compression ring permitting spherical movement of outer race of the ball bearing within the retainer to provide self alignment while preventing rotational movement of the outer race as the inner race rotates in response to a shaft rotation.

2. A self-aligning ball bearing assembly as claimed in claim 1 and wherein the elastomeric compression ring is made of a material selected from the group consisting of Polyurethane, Nitrile, Viton, Ethylene Propylene Diene Monomer (EPDM), Polytetrafluoroethylene (PTFE), Neoprene, Silicone, Fluorosilicone, Aflas, Kalrez®, and combinations thereof.

3. A self-aligning ball bearing assembly as claimed in claim 1 and wherein the at least one ball bearing is configured to accommodate a shaft having a diameter of about 0.5 inches or less.

4. A self-aligning ball bearing assembly as claimed in claim 1 and wherein the ball bearing is movable within the retainer such that the central axis of the ball bearing may move between about +5 degrees and about −5 degrees with respect to the central axis of the retainer.

5. A self-aligning ball bearing assembly as claimed in claim 4 and wherein the ball bearing is movable within the retainer such that the central axis of the ball bearing may assume any orientation within a cone having a half angle of about 5 degrees about the central axis of the retainer.

6. A self-aligning ball bearing assembly as claimed in claim 1 further comprising a recess formed in the outside wall of the retainer adjacent one end, the recess being sized such that the retainer clinches within an opening in a substrate when the ball bearing assembly is pressed into the opening.

7. A self-aligning ball bearing assembly as claimed in claim 6 and further comprising a generally annular flange projecting radially outward from the at least one end of the retainer and providing a stop.

8. A self-aligning ball bearing assembly as claimed in claim 7 and wherein the generally annular flange is formed with serrations about its periphery.

9. A self-aligning ball bearing assembly as claimed in claim 1 and wherein the outside wall is generally frustroconical in shape having a smaller diameter at one end and a larger diameter at an opposite end.

10. A self-aligning ball bearing assembly as claimed in claim 9 and wherein a first portion of the outside wall adjacent the one end forms a first angle with respect to the axis of the retainer and a second portion of the outside wall forms a second angle with respect to the axis of the retainer.

11. A self-aligning ball bearing assembly as claimed in claim 10 and wherein the second portion has a diameter adjacent the opposite end selected to form a friction fit within an opening formed in a substrate when the retainer is pressed into the opening.

12. A self-aligning ball bearing assembly as claimed in claim 11 further comprising a generally annular rim projecting radially outwardly from the retainer at the opposite end thereof and forming a flanged stop that extends radially outward from the retainer.

13. A self-aligning ball bearing assembly as claimed in claim 1 further comprising a pillar block having an opening and wherein the self aligning ball bearing assembly is disposed within the opening of the pillar block.

14. A self-aligning ball bearing assembly as claimed in claim 1 further comprising mounting flange having an opening and wherein the self-aligning ball bearing assembly is disposed within the opening of the mounting flange.

15. A self-aligning ball bearing assembly as claimed in claim 1 further comprising a shaft having an axial opening at one end and wherein the self-aligning ball bearing assembly is disposed within the axial opening.

16. A self-aligning ball bearing assembly as claimed in claim 1 further comprising a sheet of material having an opening and wherein the self-aligning ball bearing assembly is disposed within the opening in the sheet of material.

17. A self aligning ball bearing assembly as claimed in claim 1 and wherein the arcuate outside wall of the outer race is generally spherical.

18. A self aligning ball bearing assembly comprising:
   a generally annular retainer having a central axis, an outside wall, and a generally conical inside wall that bounds a central bore of the retainer, the outside wall of the retainer being tapered such that one end of the retainer has a first diameter and the opposite end of the retainer has a second diameter larger than the first diameter;
   the generally conical inside wall of the retainer defining a surface oriented at an angle relative to the central axis of the retainer to define a bearing seat;
   at least one ball bearing having a central axis, an inner race, and an outer race, the ball bearing being disposed within the retainer with its outer race resting against the bearing seat of the retainer inside wall;
   an elastomeric compression ring mounted within the retainer at a location spaced from the bearing seat and bearing on the outer race of the ball bearing to hold the outer race against the bearing seat;
   the elastomeric compression ring being selected from a group consisting of Polyurethane, Nitrile, Viton, Ethylene Propylene Diene Monomer (EPDM), Polytetrafluoroethylene (PTFE), Neoprene, Silicone, Fluorosilicone, Aflas, Kalrez®, and combinations thereof; and
   the ball bearing being configured to accommodate a shaft having a diameter of about 0.5 inches or less;
   the ball bearing moving with respect to the retainer when a shaft is inserted into the ball bearing such that the central axis of the ball bearing substantially aligns itself with an axis of the shaft.

19. A self-aligning ball bearing assembly as claimed in claim 18 further comprising a self-clinching feature formed at the larger diameter end of the retainer.

20. A self aligning ball bearing assembly as claimed in claim 18 and wherein the outer race has an outside surface that is substantially spherical and wherein the spherical outside surface rests against the bearing seat.

* * * * *